US008205174B2

(12) United States Patent
Li et al.

(10) Patent No.: US 8,205,174 B2
(45) Date of Patent: Jun. 19, 2012

(54) INTEGRATED CIRCUIT MODELING METHOD AND FRAMEWORK TOOL

(75) Inventors: Suet Fei Li, Hong Kong (HK); Yunzhao Lu, Hong Kong (HK); Erik Olsson, Hong Kong (HK); Ming Hua Shi, Hong Kong (HK)

(73) Assignees: Hong Kong Applied Science and Technology Research, Hong Kong Science Park; Institute Company Limited, Shatin, New Territories, Hong Kong (CN)

( * ) Notice: Subject to any disclaimer, the term of this patent is extended or adjusted under 35 U.S.C. 154(b) by 414 days.

(21) Appl. No.: 12/542,410

(22) Filed: Aug. 17, 2009

(65) Prior Publication Data

US 2011/0041106 A1 Feb. 17, 2011

(51) Int. Cl.
*G06F 17/50* (2006.01)
(52) U.S. Cl. ........ 716/100; 716/101; 716/103; 716/104; 716/106; 716/107; 716/132; 716/136
(58) Field of Classification Search .......... 716/100–108, 716/132, 136
See application file for complete search history.

(56) References Cited

U.S. PATENT DOCUMENTS

| 6,360,192 | B2 | 3/2002 | Dearth et al. |
| 6,408,423 | B1 | 6/2002 | Khou et al. |
| 6,523,153 | B1 | 2/2003 | Takemura et al. |
| 6,526,562 | B1 | 2/2003 | Haddad et al. |
| 6,996,799 | B1 | 2/2006 | Cismas et al. |
| 2006/0190904 | A1* | 8/2006 | Haji-Aghajani et al. ........ 716/17 |
| 2006/0229858 | A1* | 10/2006 | Devins et al. ................... 703/14 |
| 2010/0241414 | A1* | 9/2010 | Yeh et al. ........................ 703/14 |

OTHER PUBLICATIONS

Balarin et al., Specification, Synthesis and Simulation of Transactor Processes, IEEE Transactions on Computer-Aided Design of Integrated Circuits and Systems, vol. 26, No. 10, Oct. 2007.

* cited by examiner

*Primary Examiner* — Paul Dinh
(74) *Attorney, Agent, or Firm* — Ella Cheong Hong Kong; Margaret A. Burke; Sam T. Yip (57) ABSTRACT

An integrated circuit modeling method 100 implementable on computer, which has an executable software model 145 having modules 140 of reusable functional cores 105 coded in a high level language and a virtual platform of the integrated circuit employable in an architecture exploration step 115. A modeling library of modules coded in high level languages and hardware level languages are provided and instantiated according to user input in a functional verification step 120 having a co-simulation environment, with interface code 170 between modules automatically generated by an interface generator 130 based on a two dimensional data array of hardware specification inputs 205, the interface code 170 further interfacing with wrappers engaged between high and hardware level language modules.

16 Claims, 9 Drawing Sheets

HW spec
Module interfaces

| | A | B | C | D | E | F |
|---|---|---|---|---|---|---|
| 1 | INTERFACE | | *ExampleModule* | | | |
| 2 | | | | | | |
| 3 | | Name | W | I/O | From/To | Description |
| 4 | *Example Input Buffer Interface* | inbuf_empty | 1 | I | ExampleInBuf | Input buffer empty |
| 5 | *IN* | inbuf_addr | 3 | O | ExampleInBuf | Input buffer address |
| 6 | *PP* | inbuf_rden | 1 | O | ExampleInBuf | Input buffer read enable |
| 7 | | inbuf_rdat | 16 | I | ExampleInBuf | Input buffer read data |
| 8 | | inbuf_rddn | 1 | O | ExampleInBuf | Input buffer read done |
| 9 | *Example Output Buffer Interface* | outbuf_full | 1 | I | ExampleOutBuf | Output buffer full |
| 10 | *OUT* | outbuf_addr | 2 | O | ExampleOutBuf | Output buffer address |
| 11 | *PP* | outbuf_wren | 1 | O | ExampleOutBuf | Output buffer write enable |
| 12 | | outbuf_wdat | 8 | O | ExampleOutBuf | Output buffer write data |
| 13 | | outbuf_wrdn | 1 | O | ExampleOutBuf | Output buffer write done |

ExampleModule / ExampleInBuf / ExampleOutBuf

HW spec
Buffer layouts

205

| | A | B | C | D | E | F | G | H | I | J | K | L | M | N | O | P | Q |
|---|---|---|---|---|---|---|---|---|---|---|---|---|---|---|---|---|---|
| 1 | STRUCT | 15 | 14 | 13 | 12 | 11 | 10 | 9 | 8 | 7 | 6 | 5 | 4 | 3 | 2 | 1 | 0 |
| 2 | | 0 | Reserved | | | | | | A[1] | Reserved | | | | | A[0] | Reserved | |
| 3 | | 1 | B[0] | | | | Reserved | | C[0][1] | | | Reserved | | C[0][0] | | | |
| 4 | | 2 | B[1] | | | | Reserved | | C[1][1] | | | Reserved | | C[1][0] | | | |
| 5 | | 3 | B[2] | | | | Reserved | | C[2][1] | | | Reserved | | C[2][0] | | | |
| 6 | | 4 | B[3] | | | | Reserved | | C[3][1] | | | Reserved | | C[3][0] | | | |

ExampleModule / ExampleInBuf / ExampleOutBuf

| | A | B | C | D | E | F | G | H | I |
|---|---|---|---|---|---|---|---|---|---|
| 1 | STRUCT | | 7 | 6 | 5 | 4 | 3 | 2 | 1 | 0 |
| 2 | | 0 | R[0] | | | | | | | |
| 3 | | 1 | R[1] | | | | | | | |
| 4 | | 2 | R[2] | | | | | | | |
| 5 | | 3 | R[3] | | | | | | | |

ExampleModule / ExampleInBuf / ExampleOutBuf

INTEGRATED CIRCUIT MODELING METHOD AND FRAMEWORK TOOL

CROSS-REFERENCE TO RELATED APPLICATIONS

There are no related applications.

TECHNICAL FIELD

The claimed invention relates generally to the design and verification of integrated circuits ("IC"). In particular, the claimed invention relates to a computer implementable modeling method of designing, simulating, verifying and implementing an IC. With greater particularity the claimed invention relates to a method of modeling using software models of an IC design at different levels of abstraction, with reuse of a common code base engaged with appropriate translation wrappers and automatic generation of interface code.

SUMMARY OF THE INVENTION

The constant increase in complexity of integrated circuits (defined herein to include Systems-On-a-Chip, "SOC") requires correspondingly greater effort for design and functional verification of the designed circuits prior to actually synthesizing the circuit in silicon. Software models of hardware modules are commonly used for various purposes in the IC development process such as algorithm development, architecture exploration, performance estimation and functional verification of hardware modules. To reduce code wastage, reusable functional blocks of high level software code, known as cores, are employed. However, there are challenges in connecting these cores mutually together throughout the development process, and also connecting them with functional elements based on lower level description languages that are used in the design and verification process. Keeping the interfaces current between high and low level elements as they are updated requires constant manual updates to interface code with concurrent risk of human error.

It is an object of the claimed invention to provide an integrated circuit modeling method for each stage of the entire IC development process. The claimed invention provides a computer implementable modeling method permitting IC design, simulation, verification and optionally actual physical implementation in a unified manner. The claimed invention may be provided as a computer program for instructing a computer to perform the steps of the method. The claimed invention may also be provided as computer readable medium encoding instructions, which when executed perform the steps of the method. The computer readable medium encoding instructions be in any form, for example encoded on a physical media, hardware such as a disk, or may simply be accessible from computer memory. The claimed invention also encompasses a computer programmed to perform the steps of the method, a computer implemented method of designing and evaluating an integrated circuit, and an integrated circuit modeling framework tool.

It is a further object of the claimed invention to provide improved planning and ease of use in IC design and verification. The claimed invention provides a top-down planning structure, moving from a system definition and high level software language coding, through to optional hardware level synthesis.

It is a further object of the claimed invention to provide the maximum flexibility and accuracy in the development process, particularly during verification. The improved modeling method according to the claimed invention enables true co-simulation of modules coded in high level software languages and hardware description languages (also referred to herein as a register transfer level "RTL" language), such as SystemC and Verilog respectively. "Coding language" refers to either one or both of high level software language and hardware description language. The instantiation of which modules (high level or hardware level) in the co-simulation environment may be user selectable.

It is a further object of the claimed invention to minimize redundant code and maximize transferability of base code. The claimed invention also has the object of utilizing the same common base code in the architecture exploration, verification and RTL synthesis stages. Preferably this is achieved through establishing a set of functional cores and selectively attaching or providing appropriate code to the appropriate cores at the appropriate stage. The same set of functional cores are preferably coded in a high level language and are deployable at any step of the method by changing or adding the appropriate code as required. The code provides external environment cooperative engagement functionality to the cores, and is attached according to the coding environment in which the core will operate, thus permitting the cores to cooperatively engage with an external environment. Preferably the external environment cooperative engagement functionality is provided by an interchangeable wrapper or inter-module communication wrapper. Preferably the cooperative engagement functionality is automatically generated, for example by an interface generator.

It is a further object of the claimed invention to minimize man hours and errors, and accelerate one or more steps in the IC development process particularly including the verification step which generally occupies up to 70% of the IC design process. The interface generator of the claimed invention generates the interface code that is provided to the external environment cooperative engagement functionality to facilitate communication across otherwise incompatible interfaces, for example by translation between the interfaces at the transaction level and the register transfer level. The translation may be between abstraction levels and/or between coding languages. The input to the interface generator of the hardware specifications may be in any form, but preferably they do not use any specific input specification language, only knowledge of hardware specifications, thus facilitating user access to the modeling framework tool. Preferably the inputs are one or multi dimensional arrays, and even more preferably are two dimensional arrays such as spreadsheets. The interface generator may generate multiple kinds of wrappers as selected, which may be for different simulators. The interface generator may also have error handling functions and verification of the generated interface code functions. The generator may enable the generated code to be ported to other software platforms.

Other aspects of the claimed invention are also disclosed.

BRIEF DESCRIPTION OF THE DRAWINGS

These and other objects, aspects and embodiments of this claimed invention will be described hereinafter in more details with reference to the following drawings, in which:

FIG. 8 is an example representation of the hardware specification inputs;

DETAILED DESCRIPTION OF THE INVENTION

Figure 1:
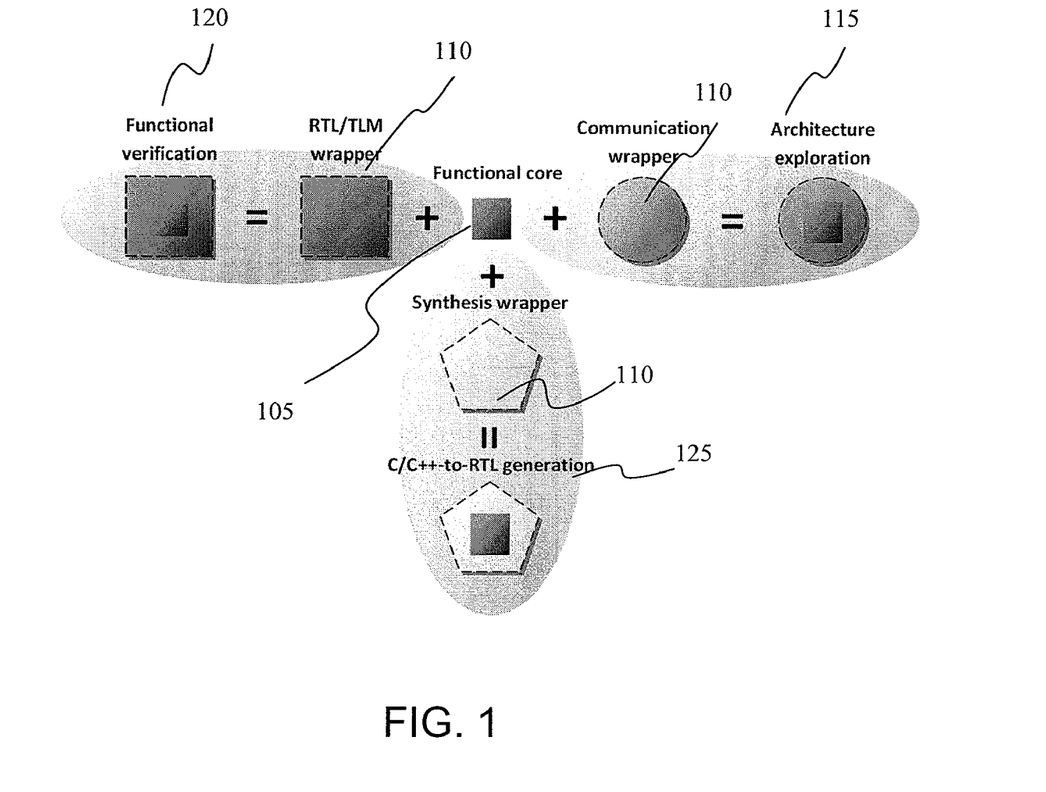
FIG. 1 demonstrates how the functional cores of the claimed invention can be deployed via interchangeable wrappers.

FIG. 1 exemplifies how different wrappers 110 can be applied to the same functional core 105 and used in different steps of the method 100. For example, by applying RTL/TLM wrapper 110 which is a type of interconversion or co-simulation wrapper enables core 105 to be used in functional verification step 120 whereas application of a communication wrapper 110 allows usage during architecture exploration step 115 whereas application of a synthesis wrapper 110 enables C to RTL generation step 125.

Figure 2:
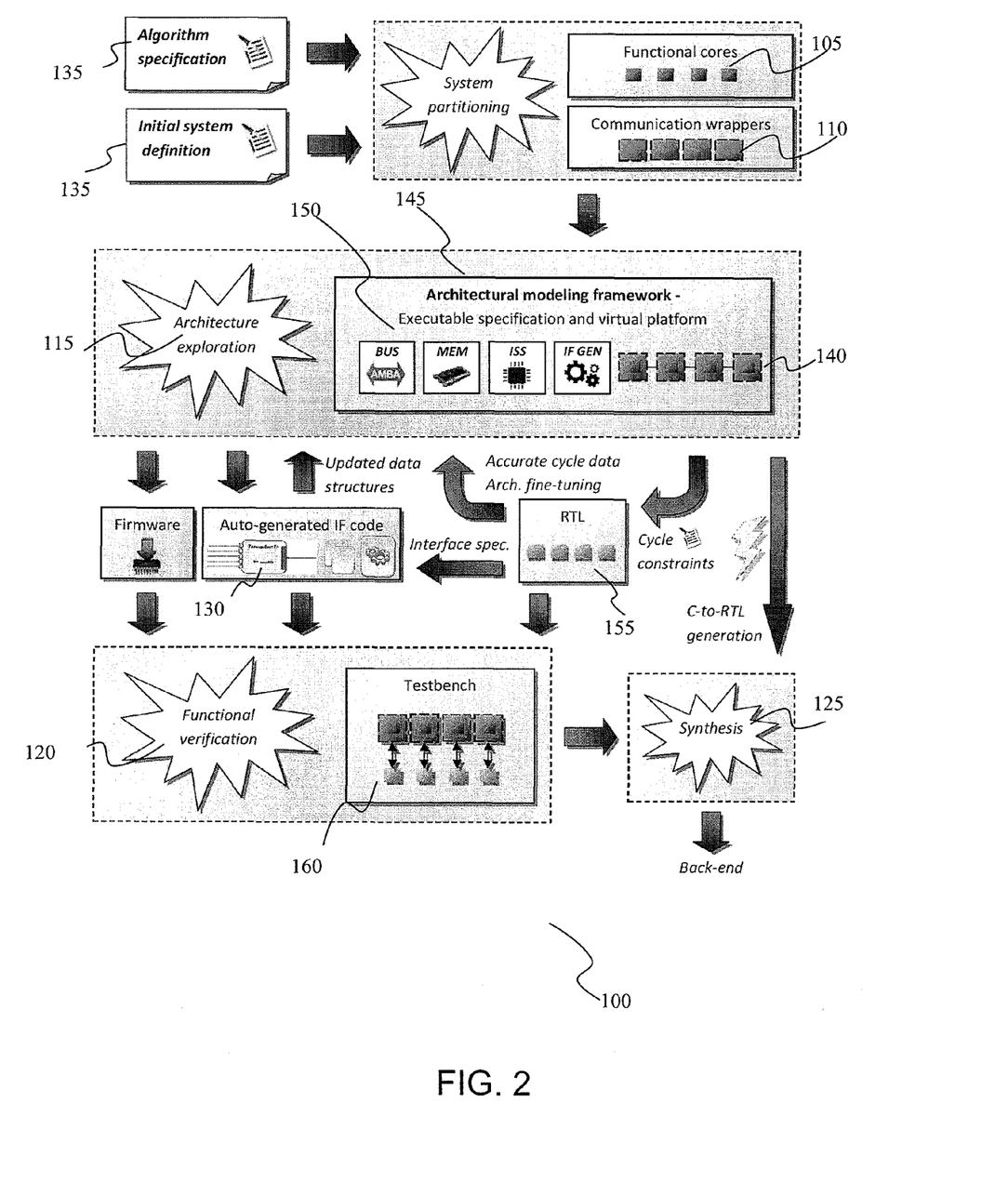
FIG. 2 represents a top level overview of the functionality and steps provided by the method according to the claimed invention.

This maximizes the reuse of functional code contained within each functional core 105 throughout the modeling method 100 (FIG. 2). The wrapper will thus cooperatively engage with an external environment allowing the wrapped code, such as the functional cores 105, to be used in different environments.

The functional cores and wrappers represent the basic functional blocks of a software model of the integrated circuit, which is defined in system design inputs. As shown in FIG. 2 and in more detail in FIG. 3, system design inputs 135 comprising algorithm specifications and initial system definitions are supplied. The algorithm specification describes the functionality of the components in the system that is to be designed and may be expressed in a number of ways, including mathematical notation or described in some form of specification- or programming-language, for example C/C++, MATLAB or UML. Preferably it is a high level language. The initial system definition lists requirements such as regarding performance, power and area that guide the design of the system.

Figure 3:
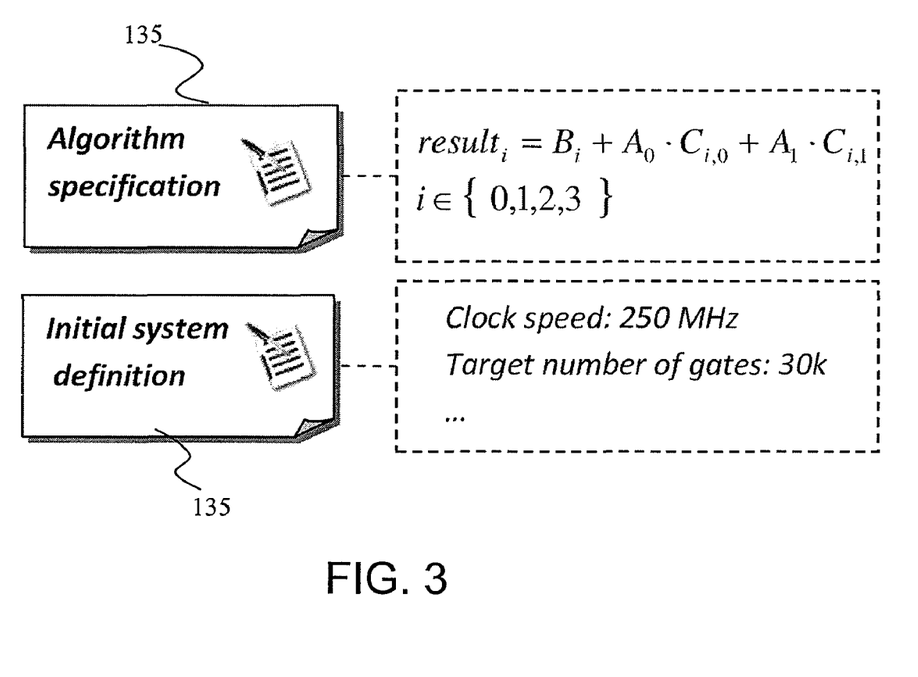
FIG. 3 is an example representation of the design inputs of the integrated circuits.

FIG. 3 shows part of the algorithm specification for a simplified example module. The behaviour described in the algorithm specification in FIG. 3 is implemented by the functional core 105. FIG. 3 also shows examples of planning constraints and requirements in the initial system definition. These numbers used for clock speed and gate count are for illustration purposes only.

Based on the system design inputs 135, the system is partitioned into high level modules 140 (FIG. 2), each having a functional core 105 and a wrapper 110 as described above. An executable software model 145 of the integrated circuit is then established from the high level modules 140 and from other system components 150 of the integrated circuit. As can be seen in FIG. 2, these components 150 include memory, bus and processor models. The executable model 145 is preferably entirely in a high level coding language such as SystemC at the TLM level.

The executable model 145 (FIG. 2) is then refined in a refining step. In one embodiment said refining step is an architecture exploration and optimization step 115 (FIG. 2) of the integrated circuit that is being modelled.

In said refining step, various designs for the integrated circuit are explored, algorithms appraised and design restrictions such as bottlenecks reduced. This results in a refined model having more optimal functional characteristics. In one embodiment, the architecture exploration and optimization step 115 is iterative, so that a first software model is evaluated, leading to a second software model based on the first being established and in turn evaluated, and so on, in a sequence of sub refining steps, each subsequent model ideally being more refined than the predecessor.

In greater detail, issues that are considered during architecture exploration include for example the types, sizes and formats of on-chip buffers, strategies for pipelining of modules as well as choice of bus width.

In another embodiment (not shown), said refining step includes an updating step, wherein the software model is updated to a second software model to reflect changes made to the architecture during creation of the hardware description language modules. For example, a certain module is partitioned into 2 or more hardware description language modules, in which case the same partitioning has to be made in the software model. Another example is adding additional buffers between modules, or changing buffer formats.

In yet another embodiment (not shown), the refining step is the updating step.

In an optional further refining step the executable model 115 is further refined resulting in a final executable model. In one embodiment, refinement of the timing accuracy is achieved from evaluation of feedback from hardware description language modules 155 corresponding to the high level software modules, which test the system's performance at the hardware level (RTL). The RTL implementation allows collection of accurate timing information that is used to improve the accuracy of performance simulation in the method. Each high level module within the software model is annotated with timing estimates that are derived from any of a number of sources. Module timing estimates are based on previous or similar designs, calculated mathematically based on the functionality of the module, predicted based on prior experience of the engineer or output as performance logs from simulation of a corresponding module written and simulated in a hardware description language. In some embodiments certain software modules, e.g. buses or instruction set simulators, are licensed from third party vendors, and hence already include accurate timing annotations. The accurate timing information is input into the software model as timing annotations, such as by using SystemC wait( ) statements. The timing is then assessed against the RTL implementation.

The hardware description language modules 155 are preferably established using automated high level to hardware description level synthesis tools (not shown).

The architectural modeling framework (FIG. 2) can optionally include one or more CPU models on top of which firmware can run. As shown in FIG. 2, this enables engineers writing the firmware that will run on the SOC to do design, simulation and development using the modeling framework prior to functional verification and before the real hardware is physically implemented.

Figure 4:
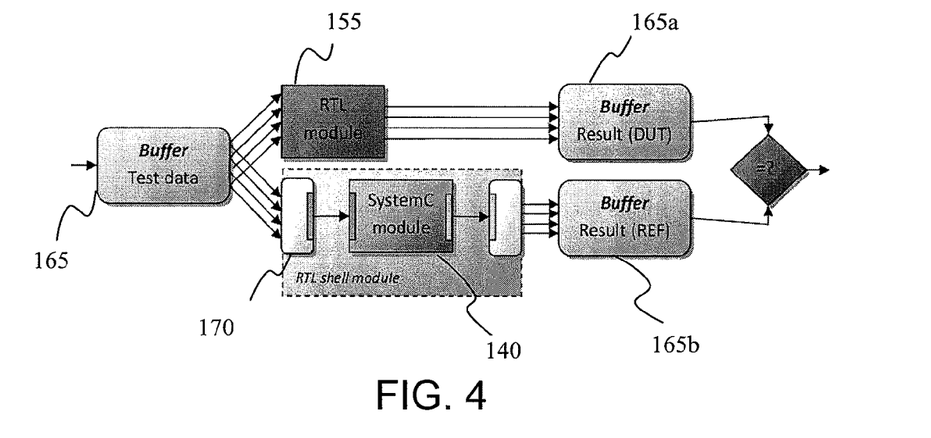
FIG. 4 represents a typical verifying step.

The functional accuracy of the hardware description language modules is then verified against the refined executable model in a verification step 120. As shown in FIG. 2, a test bench 160 is established. This is shown in more detail in FIG. 4, wherein the same test data is supplied from a buffer 165 to both of a high level (SystemC) module 140 from the refined executable model, via interface code 170, and a hardware description level (RTL) module 155. The output from both modules is collected in separate buffers 165a, 165b before being compared. If the output of each hardware module 155 is identical to its functional equivalent high level module 140, verification of the hardware description level modules 155 is successful.

As an optional final step, a complete hardware description level description of the IC can be synthesized from the executable model 145 in a synthesis step 125 (FIG. 2), preferably using synthesis tools. The output may be directly communicated to or control silicon fabrication apparatus (not shown).

Because different abstraction levels and different coding languages are used, the environment of the verification step 120 supports both simultaneously, for example in a co-simulation environment. In one embodiment the modeling method 100 establishes a mixed language coding environment, such as that provided by the Cadence NCSC simulator. Either pin-accurate NCSC or hierarchical path NCSC may be implemented, and optionally both simultaneously. Hierarchical path NCSC is preferred for its greater speed. NCSC allows accessing data directly by calling a function which returns a handle to a memory. The function takes as parameter a string that specifies the hierarchical path to the memory. The memory can then be read/written through the handle. Pin-accurate interface means that input/output is modeled close-to-hardware, allowing wires to be connected in the same way as to a pure RTL module. In an embodiment supporting both simultaneously (not shown), a subset of the inputs/outputs are modeled at a closer-to-hardware pin-accurate level, while other inputs/outputs are implemented using hierarchical path access.

In another alternative embodiment, a programming interface may be interposed between modules, such as a direct programming interface, for example System Verilog Direct Programming Interface, Verilog Procedural Interface, or Program Language Interface.

However, in either case, interface code to translate between the high level and hardware level modules is needed. At the RTL level, communication takes place through low-level signaling with specific protocols and data formats. At the TLM level, communication takes place at a higher level of abstraction, and thus does not require adherence to low level protocols and data formats.

This interface code is provided by an interface generator 130, the code being generated prior to the verifying step 120, as shown in FIG. 2. The interface code and generator 130 is discussed in more detail below.

Figure 5:
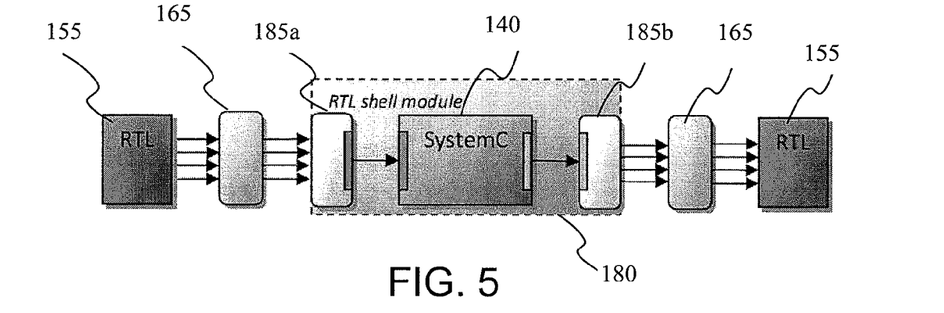
FIG. 5 is a schematic representation of instantiating a high level module in mixed language environment.
Figure 9:
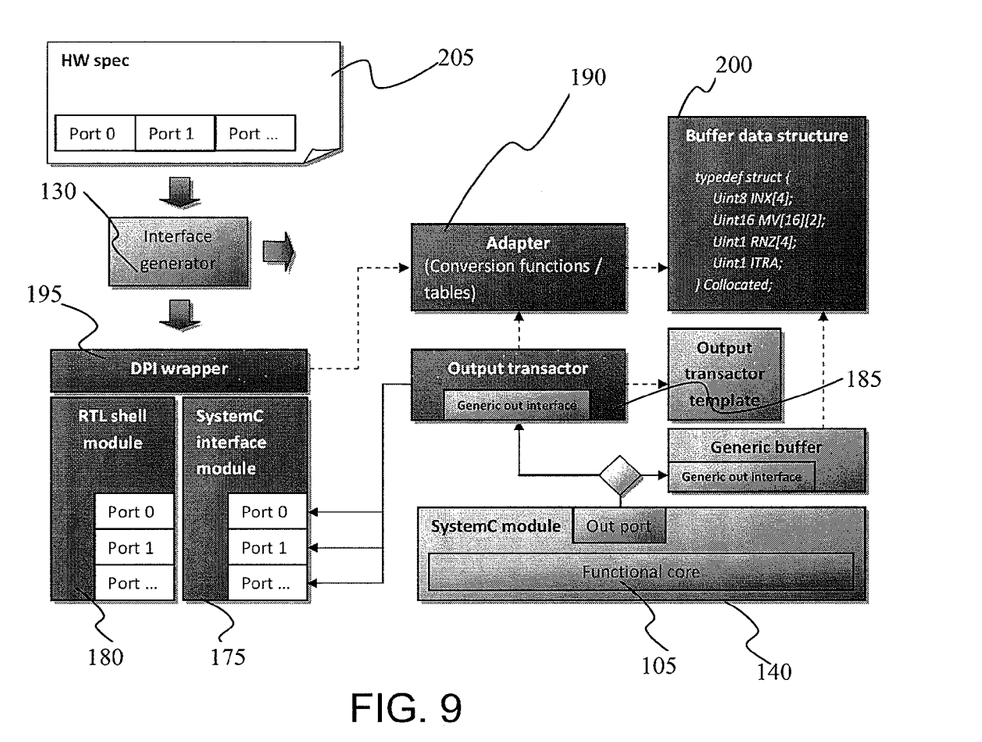
FIG. 9 shows examples of the types of interface code that the interface generator can generate.

In FIG. 5 a high level module 140 is instantiated in a NCSC environment and connected with two RTL modules 155 via buffers 165. The module 140 comprises a functional core (not shown) inside a SystemC wrapper which itself is cooperatively engaged with a RTL shell module 180. Data inputs and outputs from input and output ports on the SystemC module 175 are passed between input transactors 185a and output transactors 185b respectively contained within the RTL shell module 180, which provide conversion between interfaces, data formats and protocols between high and hardware levels. Transactors are communication channels having generic interfaces, and adapt between high level and low level transactions, for example a simplified buffer interface in C++ and a buffer interface written in Verilog respectively. Transactors may have inbuilt conversion functions or rely on other interface code that they can access via function calls such as adapters 190 (FIG. 9).

The RTL shell module 180 further implements a hardware-accurate port interface, with the converted inputs and outputs being communicated from the RTL shell module 180 via buffers 165 to RTL modules 155.

Figure 6:
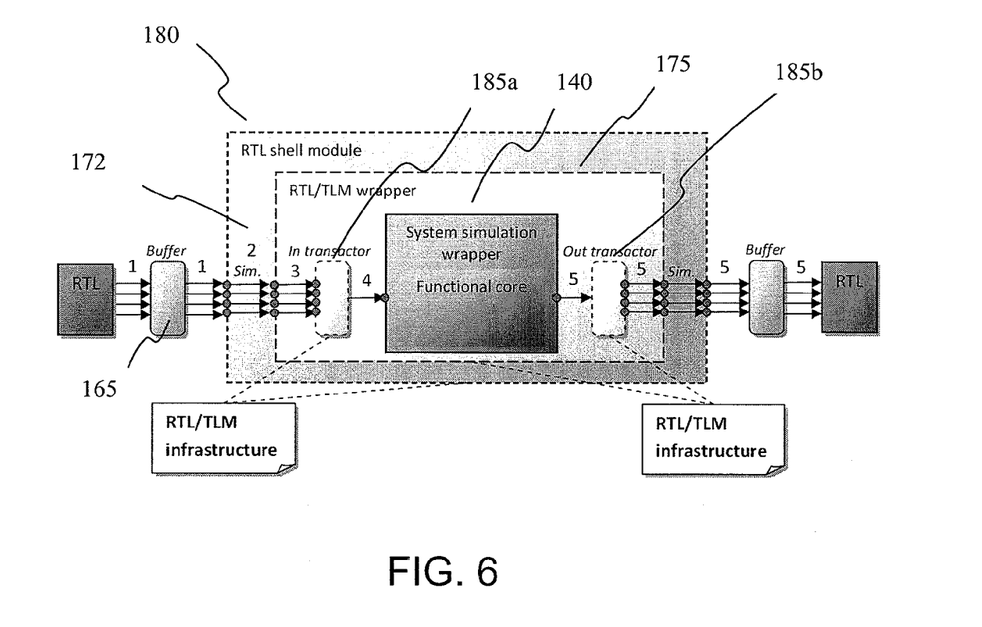
FIG. 6 is a more detailed representation of the high level module of FIG. 5.

In FIG. 6, the interchangeable wrapper—in this embodiment a system simulation wrapper—is cooperatively engaged with an interconversion wrapper—in this embodiment a RTL/TLM wrapper 175—which is itself cooperatively engaged with a hardware shell module—in this case a RTL shell module 180. In this embodiment the co-simulation NCSC environment 172 automatically handles the connections between the RTL shell module 180 and the RTL/TLM interconversion wrapper 175 although other embodiments use other connection means such as transactors. Data at the RTL level is communicated to ports on the RTL shell module 180, which is then passed via the NCSC environment to ports on the RTL/TLM wrapper 175 of interface code, which in turn is passed to the transactor 185, which via function calls to an adapter (not shown), converts the RTL data to TLM data and passes it to a port on the high level module 140.

FIG. 6 also shows that the input 185a and output transactors 185b form part of a RTL/TLM wrapper 175 of interface code. Code automatically generated by the interface generator is shown in dashed lines. In the embodiment of FIG. 6, some code is also manually generated and is shown in bold.

Figure 7:
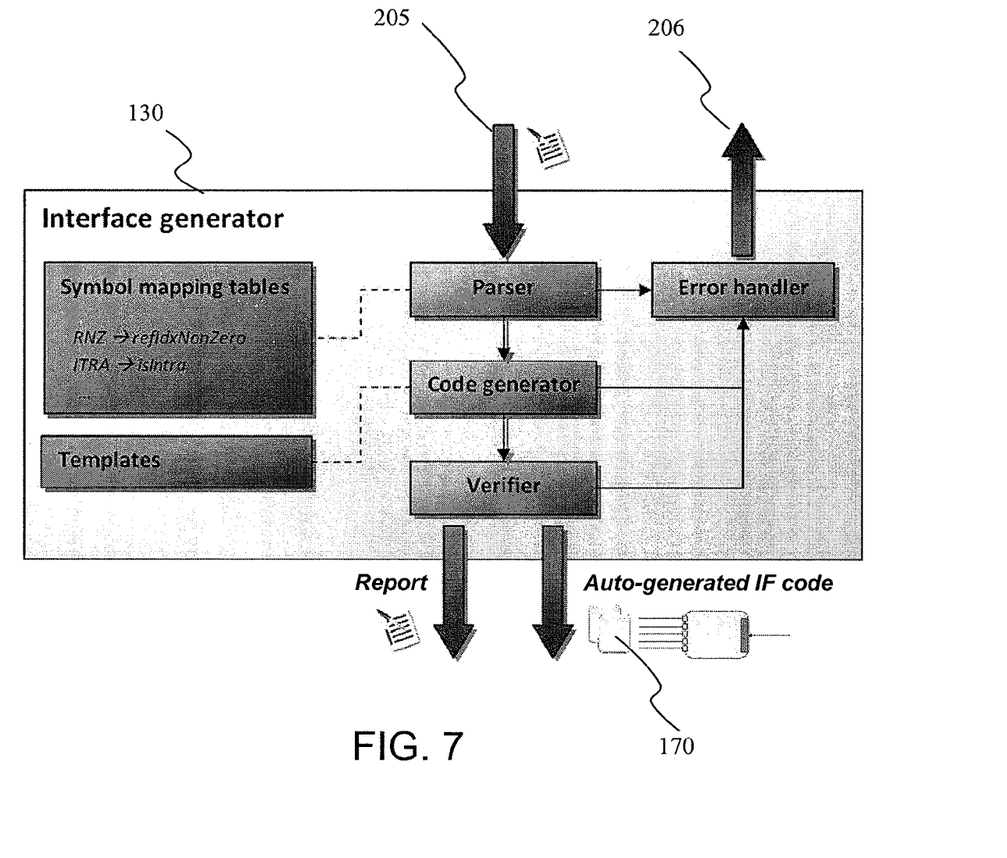
FIG. 7 represents the interface generator.

FIG. 7 shows a functional overview and operational flow of the interface generator 130. The interface generator 130 automatically produces the previously mentioned infrastructure based on the hardware specifications inputs 205. Because the inputs are preferably in the form of a multi variable list or table, or more preferably as a two dimensional array, such as a spreadsheet, the interface generator 130 provides a push-button approach to automatically generate interface code 170 and maintain the interface code 170 in a current state. Each time the interface code is updated it is provided to the external environment cooperative engagement functionality. The interface generator 130 is implementable in various ways that provide access to the hardware description inputs 205 in the above formats. In one embodiment the generator is a software program implemented in any kind of suitable programming language, such as for example C, C++, Java, Python, Perl, Visual Basic, etc. In other embodiments it is implemented using the scripting facilities in a word processor or spreadsheet software, for example by writing scripts in Microsoft® Excel to process data in spreadsheets.

The interface generator 130 takes inputs, parses them and generates interface code 170. An internal symbol mapping table is referenced during parsing. An internal library of templates is referenced during code generation. Finally, the generated interface code 170 is optionally checked that it can be compiled and run using test data in an internal verifier module. Any errors at any stage are reported in an error report 206. A report and optionally a history log (not shown) of the changes can be produced, and optionally supplied to all users of the computer implemented method of the claimed invention. The interface generator 130 can be used to re-generate code whenever the hardware specification inputs 205 change.

FIG. 8 shows an embodiment in which the hardware ("HW") specification inputs 205, 205 are in the form of Microsoft® Excel sheets. These are typically module interface and buffer layouts, having detailed information about port interfaces, connectivity and input/output data width. In the particular embodiment shown, the sheet specifies that there is one input ("IN") interface and one output ("OUT") interface, both of which are connected to Ping-Pong buffers ("PP"). The sheet also specifies the name of the buffer that the input and/or output interface is connected to: in the illustrated embodiment of FIG. 8 the input interface is connected to "ExampleInBuf" and the output interface is connected to "ExampleOutBuf". The word "INTERFACE" indicates that the sheet specifies the input/output interface of a module named "ExampleModule".

As shown in FIG. 9, the interface generator 130 generates different types of interface infrastructure from the hardware specification inputs 205, including shell modules 180, transactors 185, adapters 190, data structures 200, DPI wrappers 195 and other wrappers 175 and modules. These types of interface code are shown in the darkly shaded boxes of FIG. 9. Although only output interfaces are shown, input interfaces are generated in the same way.

The interface code is provided to the interchangeable wrappers, either separately or as an integral part. The interface code may include the interchangeable wrappers. FIG. 9 demonstrates possible interactions of the various interface code. Solid lines indicate communication channels; dotted lines indicate dependency or function calls. A functional core 105 and an interchangeable wrapper constitute a SystemC module 140 which has an out port, said out port being connected to a generated output transactor via a generic out interface. The output transactor is generic and is templatized with a buffer data structure. The output transactor itself uses the conversion functions of a generated adapter 190, which itself uses a generated buffer data structure.

The buffer data structures and adapters are generated based on hardware buffer definitions, which contain detailed information about the exact bit alignment of buffer contents.

Based on the data in the hardware specification inputs 205, code can be generated to convert the low level layout of raw byte data into data structures 200, such as a multidimensional array, which can be used in the high level software model 145.

Then RTL shell modules 180 and interchangeable wrappers, such as SystemC interface modules 175, having output ports, are generated according to the hardware specification inputs 205. These are in communication with the output transactor 185.

In an embodiment using DPI, the automatically generated DPI wrapper 195 defines functions used for passing data between RTL/C++.

Both DPI wrappers 195 and transactors 185 make use of the generated adapters 190 for data conversion.

Figure 10:
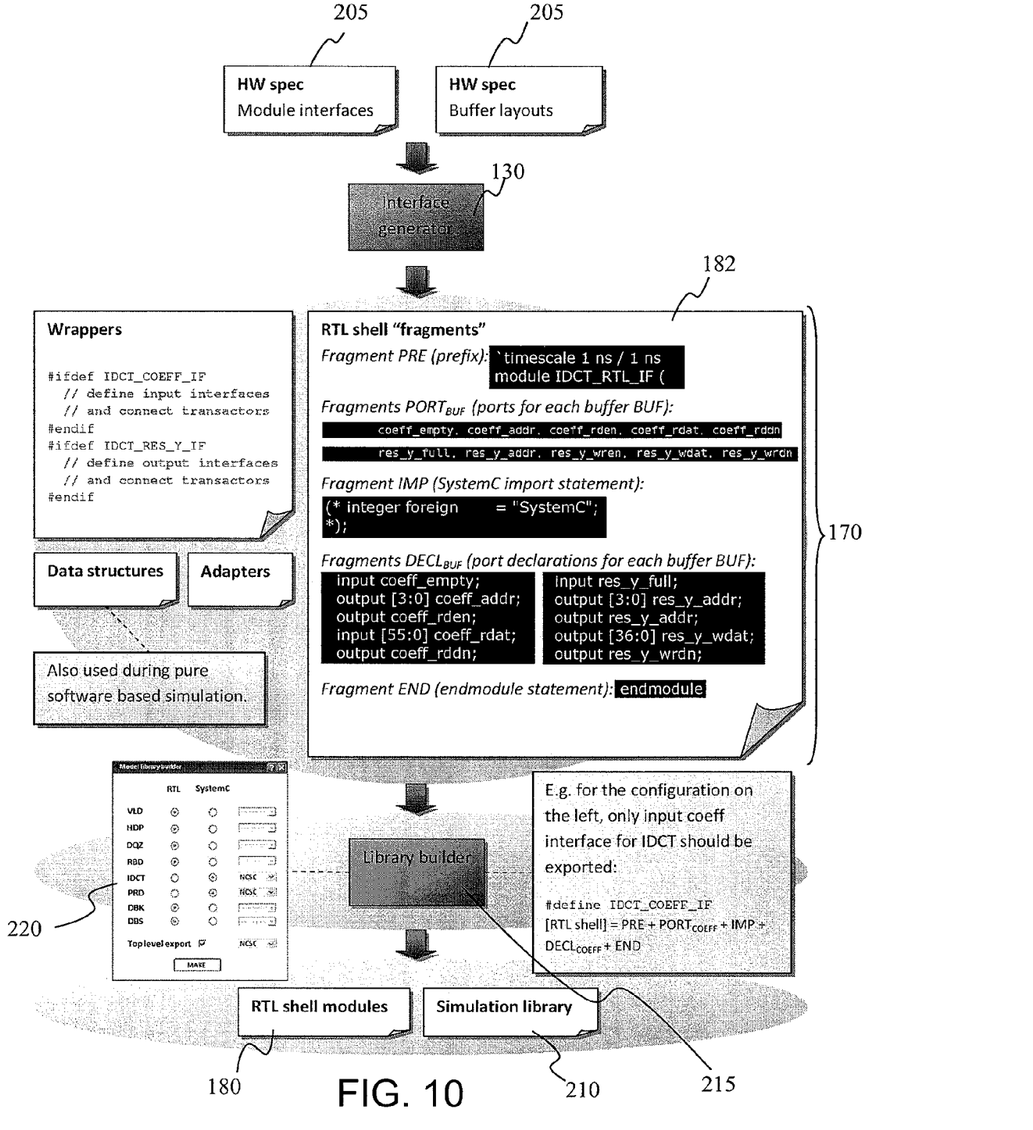
FIG. 10 is a flow chart of generating the modules for use in the verification environment.

In FIG. 10, the flow results in RTL shell modules 180 and a simulation library 210 containing software modules. The simulation library 210 is built based on code that was both automatically generated from the hardware specification inputs and based on a selected configuration of which modules to run in RTL and which to run in SystemC. Once generated the simulation library is used in the verifying step 120 (FIG. 2).

Firstly the hardware specification inputs 205, 205 are provided to the interface generator 130 which generates interface code 170, including RTL shell modules. The RTL shell modules are broken into separate RTL fragments 182 in order to be freely configurable, in other words, so that it is possible to combine the blocks to only export the port interfaces that are desired. The shell modules correspond to modules in the simulation library. The shell modules specify the in/out interfaces, and that the actual implementation is imported from the simulation library 210. In use, the user can instantiate a shell module in his RTL code, and the simulation environment will automatically instantiate the corresponding module from the simulation library.

The interface generator 130 can also generate external environment cooperative engagement functionality such as wrapper code for each functional core. In order to be able to export only the necessary port interfaces, pre-processor directives (not shown) are inserted to conditionally compile only the parts of the source code that correspond to the desired configuration.

Adapters are generated for use by transactors (not shown) to perform conversion between different abstraction levels. There are also generated new and/or updated data structures to be used by the modelling method 100 (FIG. 2). This means that minor changes such as bit width of identifiers, or the positioning of identifiers within hardware buffers, will not affect pure software simulation.

Figure 11:
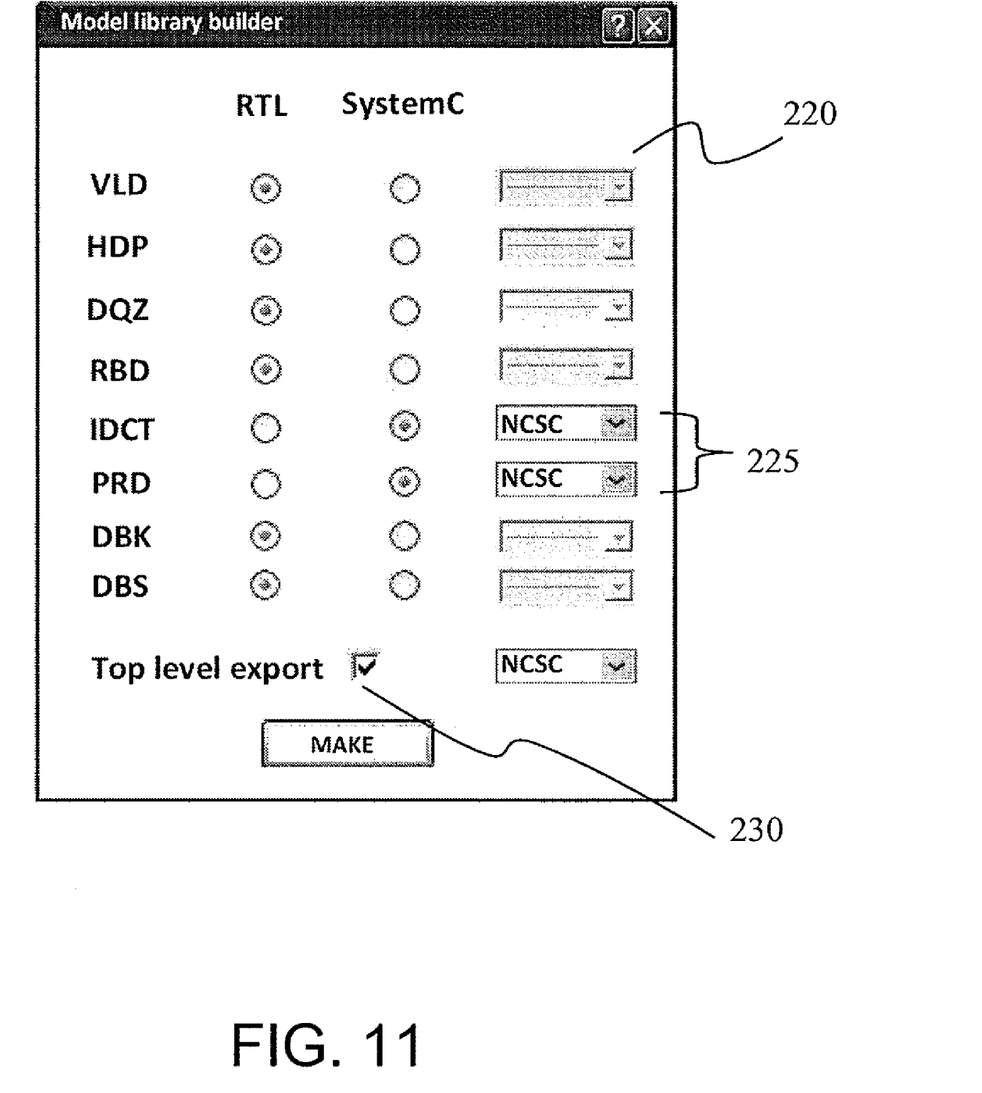
FIG. 11 is an example representation of a user interface module.

A library builder tool 215 receives as input the interface code 170 from the interface generator. Said library builder tool 215 generates the simulation library 210 containing software modules to be used for verification 120. The library builder tool 215 has a user interface module 220 for setting a user-defined configuration. A graphical user interface (GUI) of said module 220 is shown in detail in FIG. 11. The user interface module 220 permits free selection of the coding language of the modules (listed on the left e.g. VLD, HDP) which will be used in the simulation. The settings selected by the user in the GUI control affect which pre-processor directives will be defined during the build process. The preprocessor directives in turn control the configuration of the source code. For example, in the configuration of FIG. 11, two high level modules (IDCT and PRD) are selected for the library, the remaining modules being at the hardware description level. Transactors are generated for all inputs and outputs to/from IDCT and PRD modules 225 except for channels directly between IDCT and PRD modules. Buffer structures (not shown) are instantiated to connect the IDCT and PRD modules with each other. Since the top level export function 230 is checked, another module that contains a full TLM implementation of every functional module can be exported to the simulation library, and used in top-level functional verification.

Thus based on the user-defined configuration, RTL shell module fragments 182 are combined and pre-processor directives are passed to the compiler which builds the library. The library 210 is used when performing simulation for verification 120 of hardware description language modules 155 (FIG. 2).

The description of preferred embodiments of this claimed invention are not exhaustive and any update or modifications to them are obvious to those skilled in the art, and therefore reference is made to the appending claims for determining the scope of this claimed invention.

INDUSTRIAL APPLICIABILITY

The claimed invention has industrial applicability in the design and verification of circuits, especially integrated circuits. The integrated circuits designed may have any functionality. The invention is particularly suitable in designing systems on a chip (SOC). The claimed invention can be used as a standalone, implemented in software providing virtual design, exploration and verification, or can be part of a whole design and silicon synthesis system including hardware elements.

What is claimed is:

1. A computer implemented method for modeling an integrated circuit comprising the steps of:
 establishing by a computer, functional cores of a first software model of an integrated circuit;
 forming by the computer, high level modules of the first software model by selectively attaching interface code to the functional cores such that the functional cores cooperatively engage to an external environment;

creating by the computer, one or more hardware description language modules of the integrated circuit;

generating by the computer, the interface code with an interface generator from hardware specification inputs;

providing by the computer, the interface code to one or more wrappers, either separately or as an integral part and wherein the one or more wrappers are applied to the same functional cores;

refining by the computer, the first software model to provide a second software model, such that designs of the integrated circuit are explored, algorithms of the integrated circuit are appraised and design restrictions of the integrated circuit are reduced; and verifying by the computer, output of the hardware description language modules against output of high level modules of the second software model.

2. The computer implemented method according to claim 1, wherein said hardware specification inputs are in the form of an array.

3. The computer implemented method according to claim 1, wherein the verifying step further establishes an external environment being a mixed language coding environment.

4. The computer implemented method according to claim 3, further comprising the steps of making by the computer, a simulation library of modules in a coding language using a library builder tool and hardware description level shell modules, and providing said library of modules and said hardware description level shell modules to the verifying step.

5. The computer implemented method according to claim 4, wherein the library builder tool receives inputs from the interface generator prior to making the simulation library of modules.

6. The computer implemented method according to claim 4, wherein the library builder tool further provides a user interface module allowing selection of the coding language of each module in the simulation library.

7. The computer implemented method according to claim 1, the one or more wrappers are interchangeable wrapper.

8. The computer implemented method according to claim 7, wherein the interchangeable wrapper is a high level and hardware level language interconversion wrapper comprising one or more transactors accessing interface code.

9. The computer implemented method according to claim 7, wherein the verifying step further cooperatively engages the interchangeable wrapper of each high level modules of the second software model with an interconversion wrapper, itself cooperatively engaging with a hardware level shell module.

10. The computer implemented method according to claim 1, wherein the verifying step further comprises interposing a programming interface between the hardware description language modules and the high level modules of the second software model.

11. The computer implemented method according to claim 1, wherein the interface generator further selectively generates one or more data structures, hardware description language shell modules, transactors, data conversion wrappers and direct programming interface wrappers and adapters.

12. A computer implemented method of developing and evaluating an integrated circuit comprising
a first establishing step wherein system modules are established by a computer from design inputs, each system module being an inter-module communication wrapper and a functional core coded in a high level software language, wherein the inter-module communication wrapper of the system modules are applied to the same functional core;

a second establishing step wherein a first software model of the integrated circuit is established by the computer, the first software model comprising the system modules and one or more system components;

a step of refining by the computer, the first software model to provide a second software model;

a step of creating by the computer, hardware description language modules corresponding to functionality in the first software model;

a step of further refining by the computer, the second software model from evaluation of the hardware description language modules;

a third establishing step wherein a test co-simulation environment is established by the computer;

a step of generating, by the computer with an interface generator, an interface infrastructure between the system modules and the hardware description language modules;

a step of verifying by the computer, functionality of the hardware description language modules against the second software model in the test co-simulation environment.

13. The computer implemented method according to claim 12, further comprising the step of making by the computer, a simulation library in a user-selectable mixture of high level and hardware description language modules and providing the simulation library to the verifying step.

14. The computer implemented method according to claim 12, wherein the interface generator receives hardware inputs in a multidimensional array.

15. The computer implemented method according to claim 14, further comprising the step of re-generating by the computer, the interface infrastructure when the multi dimensional array changes.

16. A system for modeling an integrated circuit comprising:
a computer; and
an integrated circuit modeling framework tool executable by the computer, the integrated circuit modeling framework tool comprising:
a first software model having an executable software module of reusable functional core, coded in a high level language and applied to one or more wrappers,
a second software model generated from refining the first software model,
a virtual platform of the integrated circuit employable in an architecture exploration environment, and
a modeling library of modules coded in high level languages and hardware level languages, equally instantiable in a functional verification environment, with interface code generated by an interface generator from a multidimensional data array of hardware specifications, said interface code engaged between the modeling library of modules coded in high level and hardware level language.

* * * * *